US010371851B2

(12) United States Patent
Wu et al.

(10) Patent No.: US 10,371,851 B2
(45) Date of Patent: Aug. 6, 2019

(54) METHOD FOR FORMATION FRACTURE CHARACTERIZATION IN HIGHLY INCLINED WELLS USING MULTIAXIAL INDUCTION WELL LOGGING INSTRUMENTS

(71) Applicant: Schlumberger Technology Corporation, Sugar Land, TX (US)

(72) Inventors: Peter T. Wu, Missouri City, TX (US); Samer Alatrach, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 718 days.

(21) Appl. No.: 14/887,975

(22) Filed: Oct. 20, 2015

(65) Prior Publication Data

US 2016/0299248 A1    Oct. 13, 2016

Related U.S. Application Data

(60) Provisional application No. 62/066,634, filed on Oct. 21, 2014.

(51) Int. Cl.
*G01V 3/28* (2006.01)
*E21B 49/00* (2006.01)
(Continued)

(52) U.S. Cl.
CPC ............... *G01V 3/28* (2013.01); *E21B 47/00* (2013.01); *E21B 47/18* (2013.01); *E21B 49/00* (2013.01);
(Continued)

(58) Field of Classification Search
CPC .. G01V 3/28; G01V 3/34; E21B 49/00; E21B 47/18
See application file for complete search history.

(56) References Cited

U.S. PATENT DOCUMENTS 5,999,884 A * 12/1999 Kriegshauser ........... G01V 3/28
702/7
6,798,208 B2    9/2004 Omeragic
(Continued)

OTHER PUBLICATIONS

International Search Report and Written Opinion issued in related PCT application PCT/US2015/056568 dated Jan. 28, 2016, 12 pages.
(Continued)

*Primary Examiner* — Manuel A Rivera Vargas
*Assistant Examiner* — Yaritza H Perez Bermudez
(74) *Attorney, Agent, or Firm* — Michael Dae

(57) ABSTRACT

A method for characterizing fractures traversing a wellbore includes input to a computer multiaxial electromagnetic induction measurements corresponding to measurements made along two mutually orthogonal magnetic dipole moment axes perpendicular to an axis of the wellbore. The measurements correspond to at least one receiver spacing from a transmitter. The measurements represent induced voltage in a receiver having a same dipole moment direction as a dipole moment direction of a transmitter. A first derivative with respect to wellbore depth of the multiaxial electromagnetic induction measurements is calculated. At least one peak and an amplitude thereof of the first derivatives is calculated. The peak and the amplitude are used to determine a location and an aperture of at least one fracture traversing the wellbore.

20 Claims, 13 Drawing Sheets

(51) Int. Cl.
*E21B 47/18* (2012.01)
*G01V 3/34* (2006.01)
*E21B 47/00* (2012.01)
*G01V 3/18* (2006.01)
*G01V 3/38* (2006.01)

(52) U.S. Cl.
CPC .................. *G01V 3/18* (2013.01); *G01V 3/34* (2013.01); *G01V 3/38* (2013.01)

(56) References Cited

U.S. PATENT DOCUMENTS

| | | | |
|---|---|---|---|
| 6,924,646 | B2 | 8/2005 | Omeragic |
| 6,937,021 | B2 | 8/2005 | Rosthal |
| 2005/0256645 | A1 | 11/2005 | Rabinovich et al. |
| 2007/0168134 | A1* | 7/2007 | Strack ................. G01V 3/24 702/7 |
| 2010/0230095 | A1 | 9/2010 | Yin |
| 2012/0065889 | A1 | 3/2012 | Wu et al. |
| 2013/0335092 | A1* | 12/2013 | Wu ........................ G01V 3/28 324/333 |
| 2014/0078288 | A1 | 3/2014 | Wu |
| 2015/0276966 | A1* | 10/2015 | Wang ..................... G01V 3/38 702/7 |
| 2016/0124108 | A1* | 5/2016 | Wu ........................ G01V 3/38 702/7 |
| 2016/0282512 | A1* | 9/2016 | Donderici ............... E21B 43/26 |
| 2016/0320517 | A1 | 11/2016 | Wu |

OTHER PUBLICATIONS

Peter Wu, et al.,—Fracture Characterization Using Triaxial Induction Tools, paper D, SPWLA 54th Annual Logging Symposium, New Orleans, Louisiana Jun. 22-26, 2013 (16 pages).

Wu et al., 2007, Borehole effects and correction in OBM with dip and anisotropy for triaxial induction tools, paper SPE 110623 presented at the SPE Annual Technical Conference and Exhibition, Anaheim, California, Nov. 11-14, 2007 (20 pages).

International preliminary report on patentability issued in the related PCT Application PCT/US2015/056568, dated Apr. 25, 2017 (8 pages).

* cited by examiner

The Triaxial Array

- Orthogonal collocated transmitter and reciever coils
- 9 measured components at each tri-axial spacing $$\begin{bmatrix} Vxx & Vxy & Vxz \\ Vyx & Vyy & Vyz \\ Vzx & Vzy & Vzz \end{bmatrix}$$

First subscript – Transmitter orientation
Secondt subscript – Reciever orientation

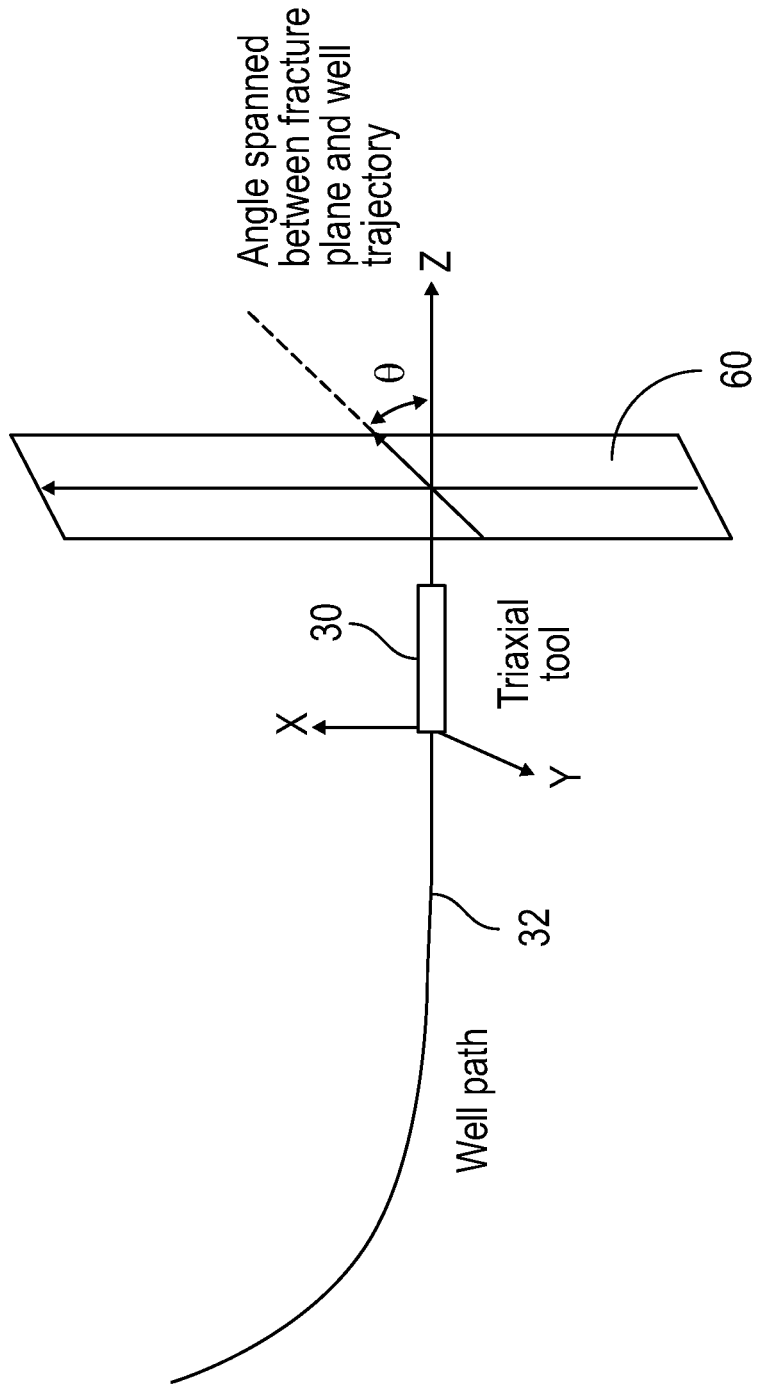

METHOD FOR FORMATION FRACTURE CHARACTERIZATION IN HIGHLY INCLINED WELLS USING MULTIAXIAL INDUCTION WELL LOGGING INSTRUMENTS

CROSS-REFERENCE TO RELATED APPLICATIONS

The present application claims priority to U.S. Provisional Application No. 62/066,634 filed Oct. 21, 2014 the entirety of which is incorporated by reference.

STATEMENT REGARDING FEDERALLY SPONSORED RESEARCH OR DEVELOPMENT

Not applicable.

BACKGROUND

This disclosure is related to the field of electromagnetic induction well logging. More specifically, the disclosure relates to techniques for characterizing fractures in subsurface formations penetrated by a wellbore that is highly inclined with respect to the fracture plane.

Finding the state of fractures in subsurface formations became important following the advent of what is termed "unconventional production", or using wellbores that traverse a formation substantially along its bedding plane to cause the wellbore to intersect large numbers of fractures in such formations, such fractures being inclined or perpendicular to the bedding plane of the formations.

Methods known in the art for detecting and characterizing fractures use, for example, borehole imaging instruments that include small (several centimeter) scale electrical resistivity and/or acoustic detectors disposed in pads placed in contact with the wall of a wellbore. These instruments make very shallow (i.e., lateral depth into the formation from the wellbore wall) measurements with respect to the wellbore wall and produce images of features essentially on the borehole wall. A good image from such instruments often requires that the wellbore is in good mechanical condition, i.e., having a smooth, uninterrupted wall free of cave-ins, washouts, etc. The drilling process itself often introduces many very shallow fractures that may be observable on the image to make it difficult for an interpreter to differentiate naturally occurring, greater lateral extent fractures from shallow, induced fractures.

Methods for using much deeper investigating multiaxial (triaxial) induction measurements to detect and characterize fractures have been introduced more recently. These methods may preferentially detect only those fractures that have substantial lateral extent from the wellbore and therefore may provide a differentiation capability that is lacking when using borehole imaging tools. However, multiaxial induction methods known in the art have proven to be most effective under the conditions of a nearly vertical well detecting near vertical fractures, i.e., the fracture plane and the wellbore axis are substantially parallel. Such methods are adequate for exploratory wells have not proven effective for unconventional production wells which are mostly drilled essentially parallel to the bedding plane of the fractured producing formation and thus at high relative angle between the wellbore axis and the fracture plane.

Very thin fractures having large planar extent filled with electrically non-conductive drilling fluid (e.g., oil based drilling mud—"OBM") may block induced eddy currents from flowing in the formation and could produce significant anomalies in inverted formation parameters compared with those from the same formation without such fractures. The size of the anomaly depends on the formation resistivities (Rh, Rv), the size of the fracture plane, and the relative dip and azimuth between the fracture plane and the layering structure of the formation. The most common fracture system encountered in unconventional productions wellbores is substantially horizontally layered formation having substantially vertical fractures. Therefore, a tri-axial induction well logging instrument may be used to detect and characterize an important part of the large vertical fracture system encountered by a wellbore drilled along the bedding plane of such a formation.

U.S. Pat. No. 6,798,208 B2 issued to Omeragic, U.S. Pat. No. 6,924,646 B2 issued to Omeragic and U.S. Pat. No. 6,937,021 B2 issued to Rosthal describe various methods for using electromagnetic induction measurements to estimate fracture orientation. None of the foregoing patents, however, disclose a method to detect the existence of fracture. All three of the foregoing patents demonstrate that if a large planar fracture is present near the wellbore, the fracture azimuth can be computed from certain electromagnetic induction component measurements oriented perpendicular to the fracture plane. However, such technique may be less valuable without the capability of identifying the existence of the fracture first. The algorithms in the foregoing patents compute an orientation which may also be due to dipping (i.e., non-horizontal) electrically anisotropic formations and have nothing to do with fractures. From a practical point of view, it is useful to have a fracture indicator first than to have a means to compute the fracture azimuth assuming a large fracture exists near the wellbore.

Usually, for resistive fractures in a conductive background formation, the triaxial induction instruments' measurements are relatively insensitive to the fracture aperture. This is because fracture planes having sufficient resistivity contrast with respect to the background formation will block the induced eddy currents in a similar manner regardless of the thickness (or fracture aperture) of the resistive fracture. Therefore, 0.1 inch aperture fracture will cause similar triaxial induction instrument responses as those from a 1 inch aperture fracture. A typical resistive fracture disposed in a conductive background formation condition is a result of OBM drilling through low resistivity fractures shale. Under this condition, using techniques known in the art it may be possible detect the location of fractures and their orientation. However, the measurements do not have sufficient sensitivity to infer the aperture of the fractures accurately.

Under the reverse logging condition, namely conductive fractures within resistive background formations such as water based mud (WBM) logging within high resistivity formations such as carbonates, organic shale, lignite or coal beds, the triaxial induction tool will have sufficient sensitivity to infer the aperture of the fractures. Most of the fractures, natural or induced, in petroleum production applications are nearly vertical. "FRACTURE CHARACTERIZATION USING TRIAXIAL INDUCTION TOOLS", Peter Wu, et al., paper D, SPWLA 54th Annual Logging Symposium, New Orleans, La. Jun. 22-26, 2013, discloses a method for obtaining estimation of an effective fracture aperture for a near vertical fracture system encountered near the wellbore using triaxial induction instrument measurements. The foregoing described method exploits the sensitive components of the measured apparent conductivity tensor or transimpedance coupling voltage measurements and inverts for effective fracture aperture using a simple model of uniform anisotropic formation background with a large vertical fracture parameterized by an arbitrary aperture width.

SUMMARY

A method for characterizing fractures traversing a wellbore includes accepting multiaxial electromagnetic induction measurements as input to a computer. The multiaxial electromagnetic induction measurements correspond to measurements made along at least one of the two mutually orthogonal magnetic dipole axes perpendicular to an axis of the wellbore. The measurements correspond to at least one receiver spacing from a transmitter and represent induced voltage in a receiver having a same dipole moment direction as a dipole moment direction of a transmitter. The method also includes calculating a first derivative with respect to wellbore depth of the multiaxial electromagnetic induction measurements, determining at least one peak and an amplitude thereof of the first derivatives, and using the peak and the amplitude to determine a location and an aperture of at least one fracture traversing the wellbore by displaying the first derivatives with respect to wellbore depth in the computer.

A system for fracture characterization includes a processor and a display. The processor is programmed to perform actions which include accepting as input to a computer multiaxial electromagnetic induction measurements corresponding to measurements made along two mutually orthogonal magnetic dipole axes perpendicular to an axis of the wellbore, the measurements corresponding to at least one receiver spacing from a transmitter, the measurements representing induced voltage in a receiver having a same dipole moment direction as a dipole moment direction of a transmitter. The processor is also programmed to perform actions including calculating a first derivative with respect to wellbore depth of the multiaxial electromagnetic induction measurements, determining at least one peak and an amplitude thereof of the first derivatives, and using the peak and the amplitude to determine a location and an aperture of at least one fracture traversing the wellbore. The system also includes displaying the determined first derivatives with respect to wellbore depth on the display.

A method for well logging includes moving a multiaxial electromagnetic induction instrument along a wellbore drilled through subsurface formations, energizing at least one multiaxial electromagnetic transmitter to impart an electromagnetic field in the subsurface formations along a plurality of magnetic dipole direction, measuring induced voltage at at least one spaced apart position from the at least one multiaxial transmitter, the measuring resulting in signals corresponding to induced voltage along two mutually orthogonal magnetic dipole moment axes each perpendicular to a longitudinal axis of the wellbore, calculating a first derivative with respect to wellbore depth of the induced voltages, determining at least one peak and an amplitude thereof of the first derivatives, and using the peak and the amplitude to determine a location and an aperture of at least one fracture traversing the wellbore by displaying the first derivatives with respect to wellbore depth.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

FIG. 4 shows an example multiaxial induction well logging instrument in a horizontal wellbore approaching a vertical fracture traversing the wellbore.

DETAILED DESCRIPTION

Figure 1A:
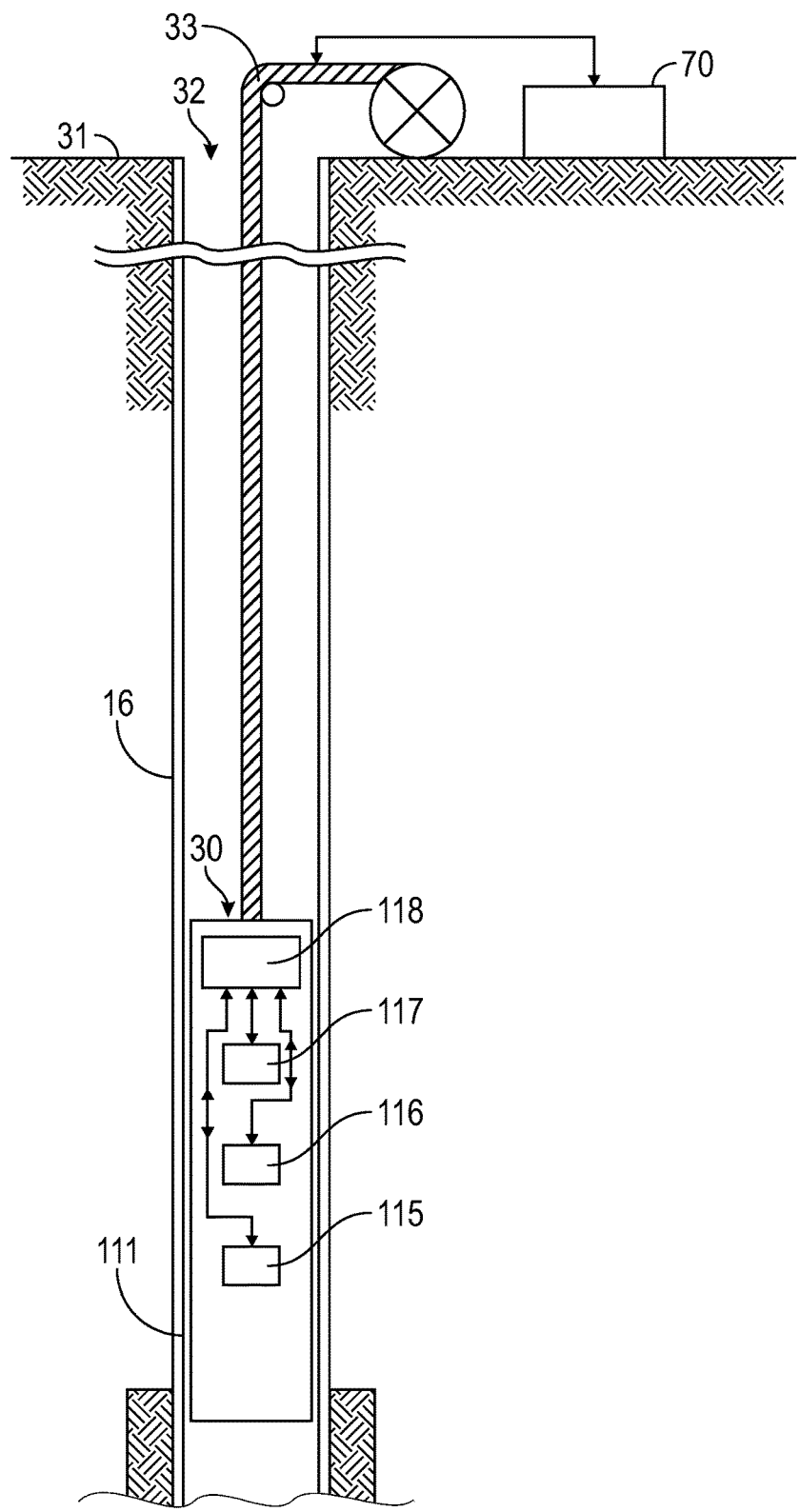
FIG. 1A shows an example wireline conveyed multi-axial electromagnetic well logging instrument disposed in a wellbore drilled through subsurface formations.

FIG. 1A shows an example multi-axial electromagnetic well logging instrument 30. The measurement components of the instrument 30 may be disposed in a housing 111 shaped and sealed to be moved along the interior of a wellbore 32. The well logging instrument 30 may, in a form hereof, be of a type sold under the trademark RT SCANNER.

The instrument housing 111 may contain at least one multi-axial electromagnetic transmitter 115, and two or more multi-axial electromagnetic receivers 116, 117 each disposed at different axial spacings from the transmitter 115. The transmitter 115, when activated, may emit a continuous wave electromagnetic field at one or more selected frequencies. Shielding (not shown) may be applied over the transmitter 115 and the receivers 116, 117 to protect the antenna coils which are deployed near the outer layer of the tool. The detectors 116, 117 may be multi-axis wire coils each coupled to a respective receiver circuit (not shown separately). Thus, detected electromagnetic energy may also be characterized at each of a plurality of distances from the transmitter 115.

The instrument housing 111 maybe coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the receivers 116, 117 may be processed by suitable circuitry 118 for transmission along the cable 33 to the recording system 70. The recording system 70 may include a computer as will be explained below for analysis of the detected signals as well as devices for recording the signals communicated along the cable 33 from the instrument 30 with respect to depth and/or time.

The well logging tool described above can also be used, for example, in logging-while-drilling ("LWD") equipment.

A non-limiting example of a logging while drilling multi-axial logging instrument is sold under the trademark PERISCOPE. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. Alternatively, the drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, preferably near the drill bit 216. The BHA 236 may include subassemblies for making measurements, processing and storing information and for communicating with the Earth's surface. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions.

Figure 1B:
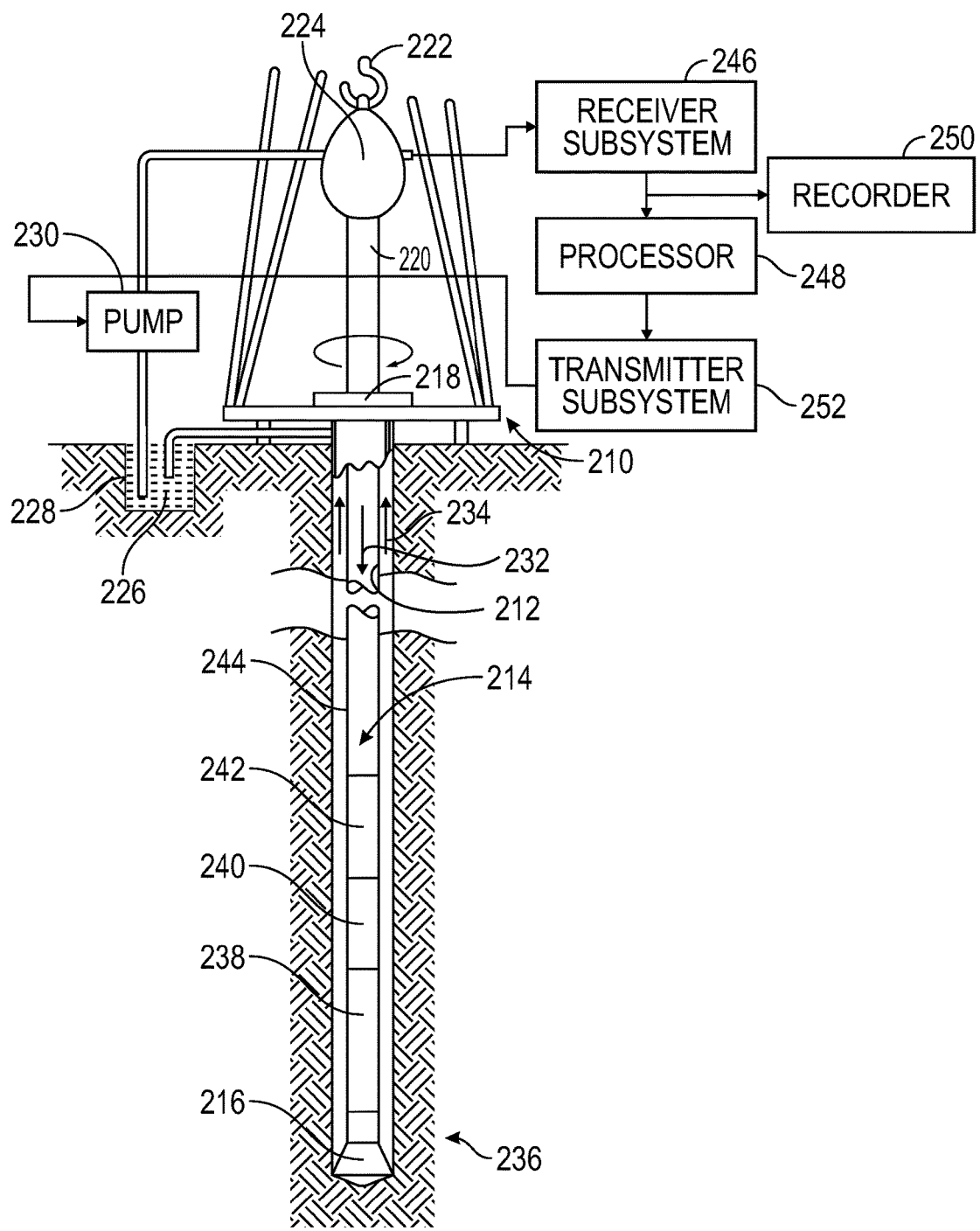
FIG. 1B shows an example well logging instrument system that may be used during wellbore drilling.

In the arrangement shown in FIG. 1B, the components of multi-axial induction well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 may also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. The data may also be stored downhole and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

While the description that follows is based on measurements made from a tool such as the RTSCANNER instrument described with reference to FIG. 1A or the PERISCOPE instrument described with reference to FIG. 1B in which each of the transmitter and receivers comprises mutually orthogonal induction coils with one coil being aligned with the instrument's longitudinal axis, it is to be understood that for purposes of defining the scope of the disclosure, any induction well logging instrument with multi-axial transmitter(s) and receiver(s) having magnetic dipole axes along other directions and in other than three magnetic dipole axis elements (e.g., coils) per transmitter or receiver may be used provided that for each such transmitter and receiver it is possible to resolve three mutually orthogonal components of the transmitted electromagnetic field and the received electromagnetic field and where such resolved components are susceptible to either or both mechanical (physically embodied) or mathematical rotation to any selected coordinate system, e.g., Cartesian or cylindrical.

Tensor induction measurements such as those explained above with reference to FIGS. 1A, 1B and 2 for well placement and reservoir characterization application have first harmonic cross-dipole couplings with up-down sensitivity. In LWD the measurement processing assumes a 1D transversely isotropic formation. In such cases, the boundary orientation [see U.S. Pat. No. 6,798,208 B2 issued to Omeragic and Wu, P., Wang, H., Minerbo, G., Homan, D., Barber, T., and Frey, M., 2007, Borehole effects and correction in OBM with dip and anisotropy for triaxial induction tools, paper SPE 110623 presented at the SPE Annual Technical Conference and Exhibition, Anaheim, Calif., November 11-14.] obtained from individual couplings is consistent for all spacings and frequencies, and corresponds to the tool azimuth where the cross-dipole coupling (XZ or ZX) is maximal for a rotating (LWD) tool (FIG. 1B), or can be obtained from the ratio of two orthogonal cross-dipole couplings XZ and YZ (and ZX and ZY) for the wireline case (FIG. 1A).

Figure 2:
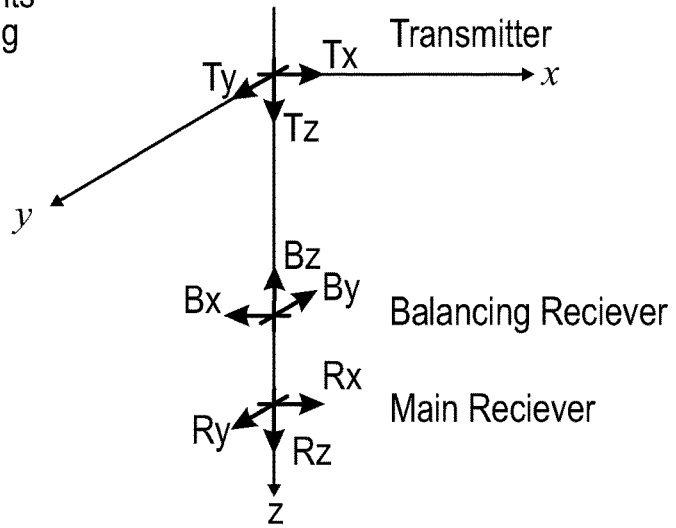
FIG. 2 shows an illustration of a multi-axial (e.g., triaxial) induction array measurement devices (transmitter and receivers) at a given spacing between the transmitter and each receiver.

A tri-axial induction tool such as the RT SCANNER described above measures nine-component transimpedance coupling voltages (Vm(i,j,k), i,j=x,y,z) which can be converted to apparent conductivity tensors (σm(i,j,k), i,j=x,y,z) at multiple longitudinal spacings from a transmitter, each represented by index k. The relation between Vm and σm is Vm=K●σm, where K is a constant k-factor matrix and ● is symbol for matrix dot-product. FIG. 2 illustrates such a tri-axial measurement. These measurements may be obtained in the frequency domain by operating a multiaxial transmitter (in this case a mutualy orthogonal three-axis transmitter Tx, Ty, Tz) with a continuous wave (CW) of a frequency selected to enhance the signal-to-noise ratio. However, measurements of the same information content could also be obtained and used from time domain signals through a Fourier decomposition process. This is a well know physics principle of frequency-time duality. Voltages are detected in corresponding receiver coil arrays which may include main receiver coils (Rx, Ry, Rz) and balancing or "bucking" coils series connected thereto (Bx, By, Bz). A plurality of receiver arrays may be disposed at different selected longitudinal distances from the transmitter. Formation properties, such as horizontal and vertical conductivities (σh, σv), relative dip angle (θ) and the dip azimuthal direction (Φ), as well as borehole/tool properties, such as mud conductivity (σmud), hole diameter (hd), tool eccentering distance (decc), tool eccentering azimuthal angle (ψ), all affect the conductivity tensors. It will be appreciated by those skilled in the art that the voltage measurement of interest is that which is exactly out of phase with the current amplitude in the transmitter, that is, one caused by induction of eddy currents in the formations (which are 90 degrees out of phase with the transmitter current) and subsequently induced in the receiver(s) by the eddy currents (which are 90 degrees out of phase with the eddy currents). Methods and apparatus for making such measurements and the principles thereof are well known in the art.

While the example shown in FIG. 2, and its embodiment in instruments such as the RT SCANNER instrument described above uses three, mutually orthogonal magnetic dipole antennas (in the form of wire coils) for each transmitter and receiver (both main and balancing or "bucking" receivers), such arrangement of not a limitation on the scope of the present disclosure. It should be clearly understood that any arrangement and number of dipole antennas may also be used if they have dipole moment directions and numbers of dipole moment directions such that the nine component tensor measurements described above may be resolved. Accordingly, use of the term "multiaxial" measurements is intended to include within its scope any arrangement of transmitters and receivers that is capable of obtaining measurements that can be directly used to obtain the 9 component tensor measurements or can be converted such as by trigonometric rotation into such tensor measurements.

Figures 3A, 3B:
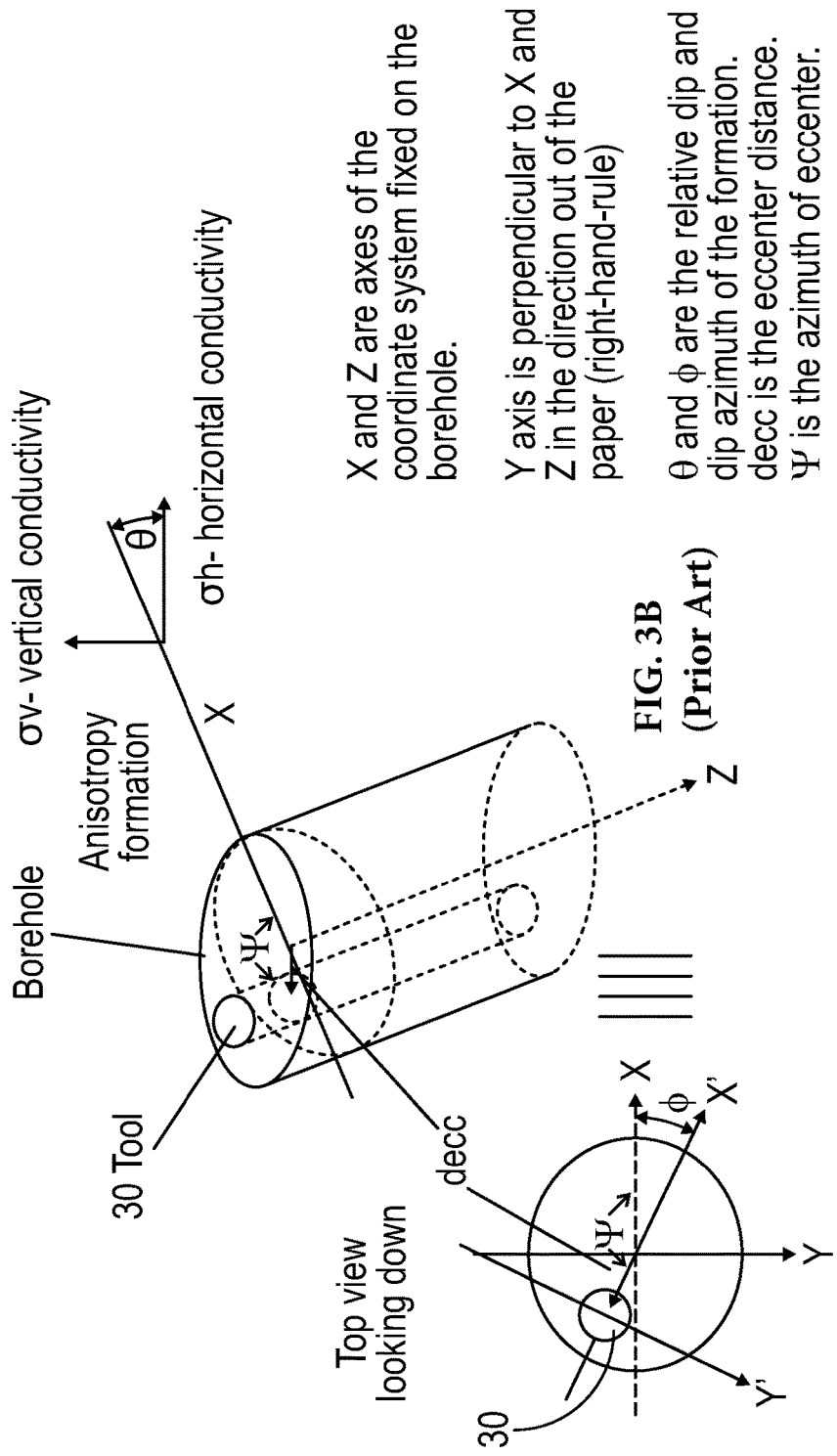
FIGS. 3A and 3B show, respectively, an illustration of an eccentered tool in a borehole, and through an anisotropy formation at a relative dip angle.

FIG. 3A illustrates a top view, and FIG. 3B illustrates an oblique view of an eccentered multiaxial induction tool 30 (such as explained with reference to FIG. 1) disposed in a wellbore drilled through an anisotropic formation with a nominal dip angle. Using a simplified model of layered anisotropic formation traversed obliquely by a borehole, the response of the conductivity tensors depends on the above eight parameters (σh,σv, θ, φ, σmud, hd, decc, ψ) in a very complicated manner. The effects of the borehole/tool to the measured conductivity tensors may be large even in an oil base mud (OBM) filled wellbore. Through known inversion techniques, the above borehole/formation parameters may be calculated and the borehole effects can be removed from the measured conductivity tensor. In FIGS. 3A and 3B, X and Z are axes of the coordinate system fixed on the borehole, the Y axis is perpendicular to X an Z is in the direction out of the paper (right-hand-rule) θ and Φ are the relative dip and dip azimuth of the formation, respectively, decc is the tool eccentering distance and ψ is the azimuth of eccentering.

FIG. 4 is a schematic of a vertical fracture 60 and a triaxial induction well logging instrument 30 in a near horizontal wellbore 32. The parameters x, y, z denote the three orthogonal directions of the magnetic moment of the triaxial coils as explained with reference to FIG. 2. The z-direction is by convention in line with the instrument axis and thus the wellbore axis. The x-direction is assumed to be pointed up or top-of-the-hole direction. The y-direction follows the right-hand rule of the standard Cartesian coordinate system. The background formation is assumed to be uniform and anisotropic. Here, an isotropic formation is considered as a subset of anisotropic formation for which the horizontal and vertical resistivities have equal value (Rh=Rv). The fracture 60 plane is assumed to be much larger than the tool.

Figure 5:
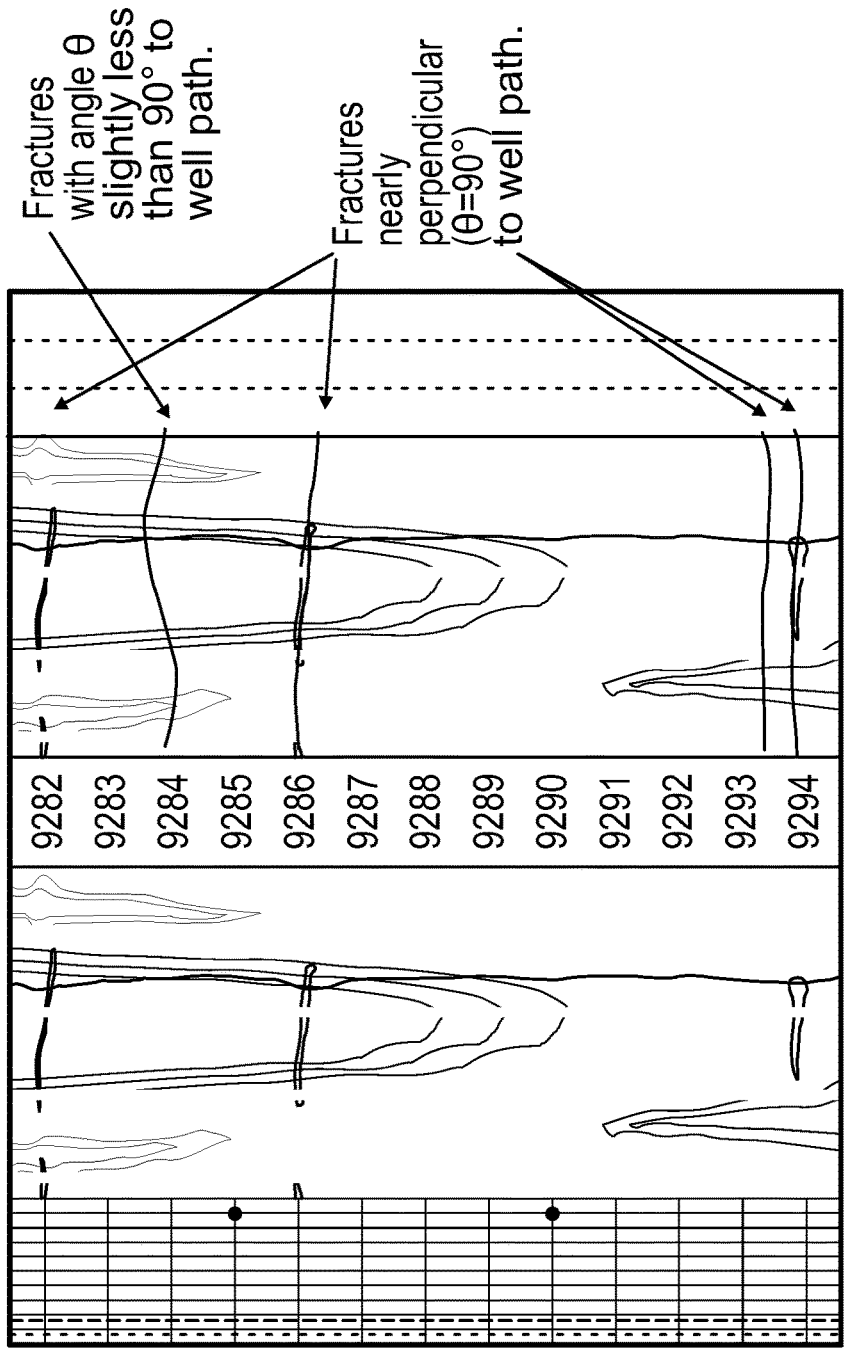
FIG. 5 shows an example image of a wellbore wall wherein the wellbore traverses a fracture and may include induced fractures.

FIG. 5 shows an example of a wellbore image made using conventional wellbore imaging instruments, such as one sold under the trademark FMI, which is a trademark of Schlumberger Technology Corporation. The example image in FIG. 5 shows several vertical fractures nearly perpendicular to the well path. These are the kind of fractures that the current method is designed to detect. We had done mathematically modeling the responses of triaxial induction tool in a horizontal well traversing through vertical fracture. These modeling works lead to the discovery of the current method.

Figure 6:
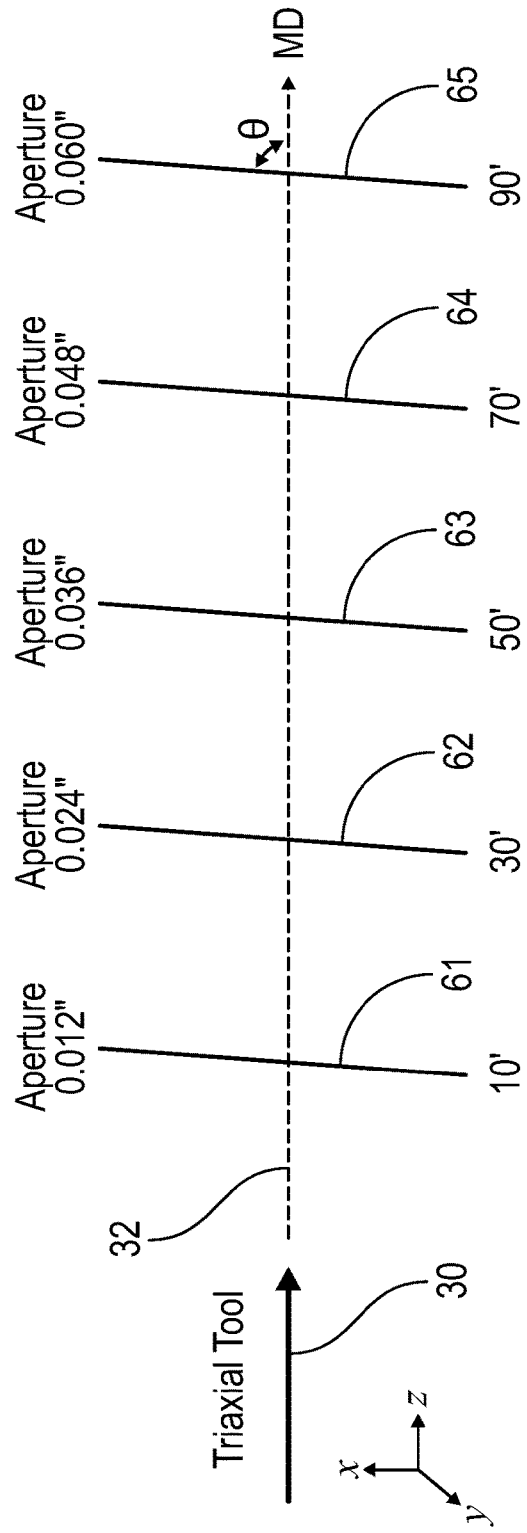
FIG. 6 shows an example of successive fractures traversing a wellbore used to model instrument response.

FIG. 6 shows a model of the triaxial induction logging instrument 30 traversing substantially horizontally along a wellbore 32 through a large vertical fracture 61 at an angle θ with respect to the fracture plane. Five fractures, 61, 62, 63, 64, 65 intersect the wellbore 32 at locations 10, 30, 50, 70, and 90 feet from the instrument 30 along the measured depth (MD) of the wellbore 32. The apertures of the fractures are 0.012", 0.024", 0.036", 0.048", and 0.060", respectively, increasing successively along the wellbore 32. The background formation horizontal resistivity (Rh) and vertical resistivity (Rv) are assumed to be 20 and 40 ohm-m, respectively. The fractures 61-65 are assumed to be open and filled with water based mud (WBM) having a resistivity of 0.2 ohm-m. The formation being modeled is very close to the Bakken formation in the Williston Basin where the oil and gas production efficiency depends to a large extent on the state of fractures of the formation.

Figure 7:
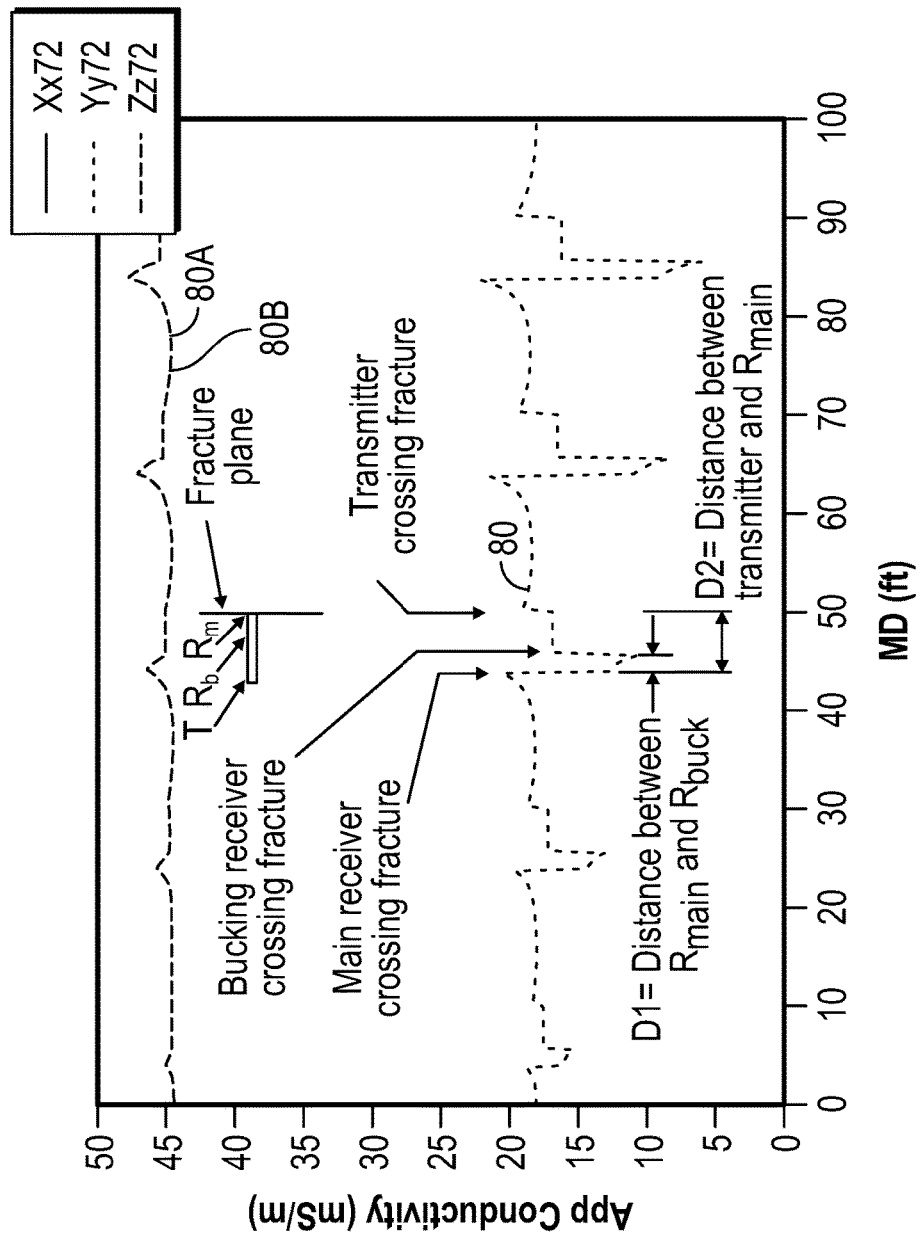
FIGS. 7 through 10 show example instrument responses modeled using the fracture model shown in FIG. 6.

FIG. 7 shows the XX (curve 80A), YY (curve 80A), and ZZ (curve 80) components of the 72 inch axial spacing conductivity tensor from a triaxial induction well logging instrument such as the RT SCANNER instrument through the example fractures of FIG. 6 at an angle of θ=90°, i.e. perpendicular to the wellbore trajectory. The transmitter to main receiver (R) distance is 72 inches and transmitter to bucking receiver (B) distance is 54". The XX and YY responses are identical in the present case and curve 80B is coincident with curve 80A. From this modeling result, one may observe the following characteristic of the triaxial signals in a horizontal well through vertical fractures:

(i) As the main receiver (R) approaches the fracture, the XX, YY and ZZ values will slowly increase;

(ii) as the main receiver R is crosses the fracture while the bucking receiver B still in front of the fracture, the XX and YY responses will drop sharply at the fracture and then continue to drop at a slower rate and the ZZ response will also drop at a still further slower rate; as the bucking receiver B is crosses the fracture while the transmitter T is still in front of the fracture, the XX and YY response components exhibit a sharp increase to a constant value until the transmitter T is about to cross the fracture. The ZZ component response shows the same constant amplitude almost equal to the expected background formation signal level (no increase in value as the XX and YY responses) as the bucking receiver crosses the fracture;

(iii) as the transmitter T is crosses behind the fracture, the XX and YY components show another sharp increase but of lesser amplitude almost to the expected background formation signal level. No significant change in the ZZ component is exhibited as the transmitter T is crosses the fracture; and (iv) the amplitude of the downward peak in the XX and YY responses is proportional to the fracture aperture.

The foregoing response characteristics suggest a method to detect the location of the fractures and estimate the relative size of the fracture aperture. If one examines the XX and YY signals, the largest feature appears to be the sharp drop in amplitude when the main receiver is crossing the fracture. The locations of the peaks in the derivative of XX and YY responses would then indicate the locations of the fracture while the amplitudes of the XX and YY response peaks may be proportional to the fracture aperture. The fracture location may thus be determined to be at the depth (axial position) of the main receiver R.

There are other characters of the XX and YY or even ZZ signal responses that may also be used to indicate the fracture location and the fracture aperture, for example, the sharp rise of the XX and YY responses when the bucking receiver B crosses the fracture or when the transmitter T crossing the fracture. Peaks in the ZZ response are also appear to be aligned with fracture locations. These features, which have lesser magnitude than that of the XX and YY response main receiver crossing point, may be practical when using theoretical noiseless data. In real measurement data with noise, keying on these features may lead to less robust results. However, these features may be used as quality control indicators for confirming the results obtained as will be further explained below.

In additional to the direct coupling XX, YY, and ZZ components, one may also use the characters of XZ, ZX, or XZ-ZX cross-components to indicate the location and the aperture of the fracture. There are limitations to using these cross components. One is that they may not be useful for fractures that are perpendicular to the well path. The second is that the response of XZ, ZX, or XZ-ZX cross-components to a fracture has a more complicated shape than those of the direct coupling components XX, YY, and ZZ. It will be more difficult to extract the fracture parameters from these components with simple algorithms.

Figure 8:
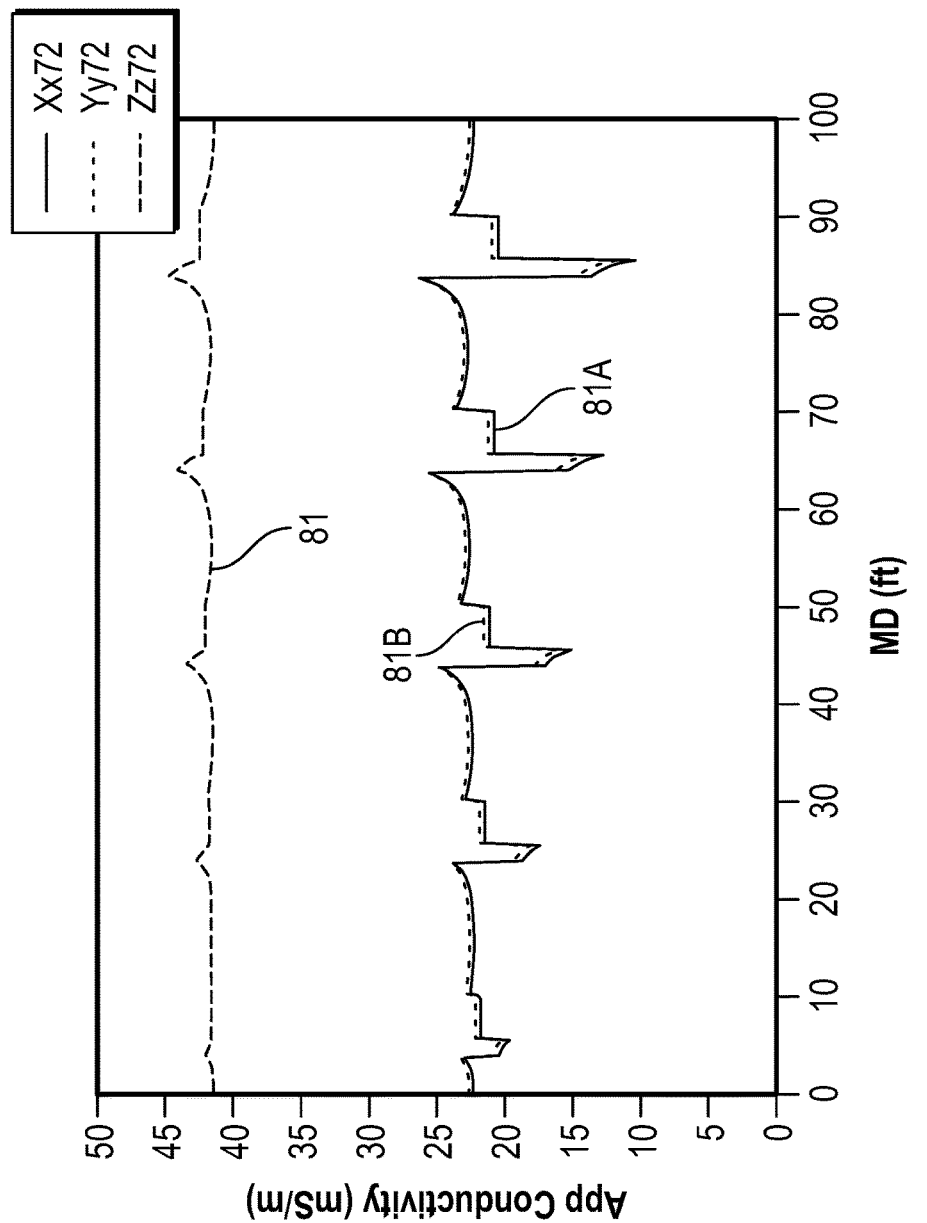
Figure 9:
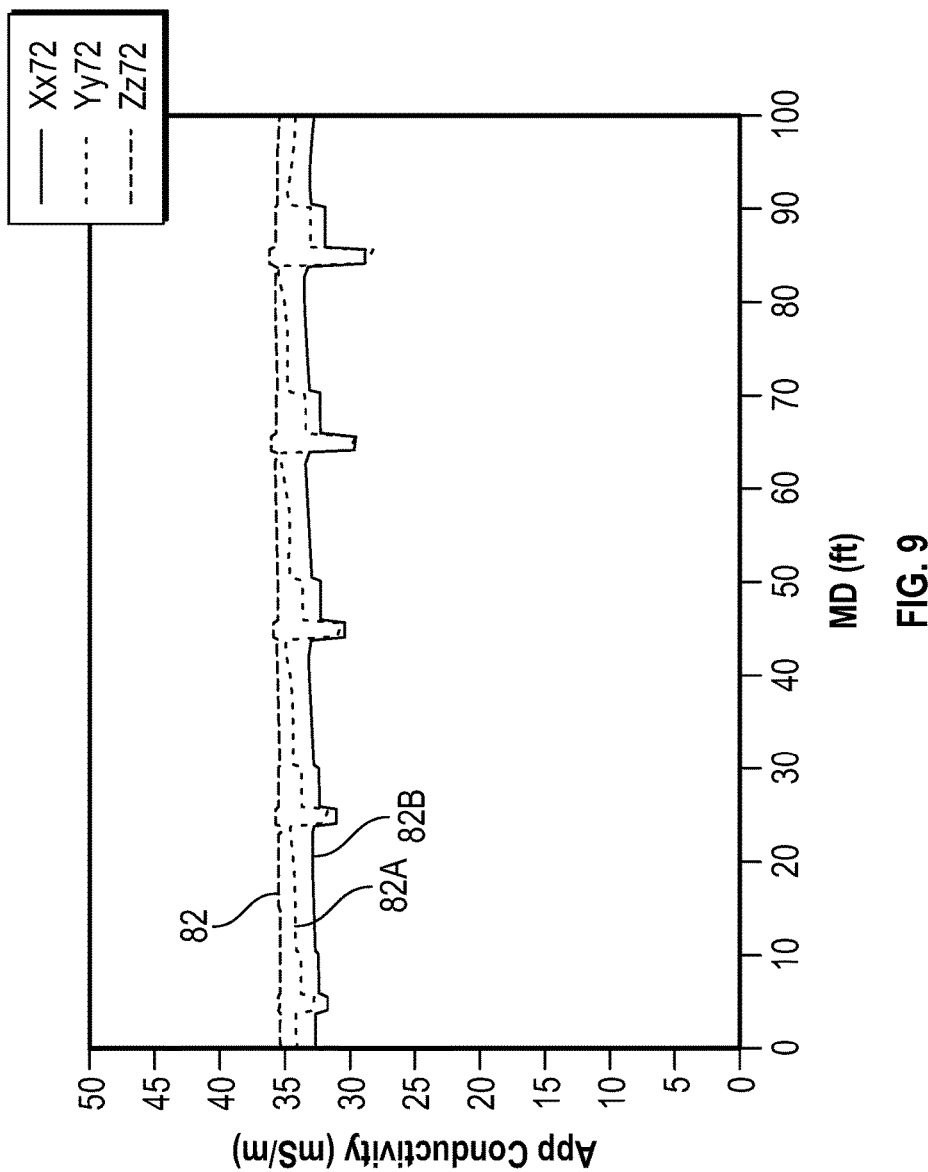

FIGS. 8 and 9 show, respectively, the XX (81B, 82B), YY (81A, 82A), and ZZ (81, 82) responses through these fractures at an angle of θ=60° and 30° with respect to the wellbore trajectory. As the angle θ decreases, the mean levels of the XX and YY response change increase and the mean response change for the ZZ response decreases. The characteristic of the fracture signals described above remain substantially the same. Therefore, the method described above for detecting the location of the fractures and estimating the relative size of the fracture aperture may be usable for a wide range of θ values.

Figure 10:
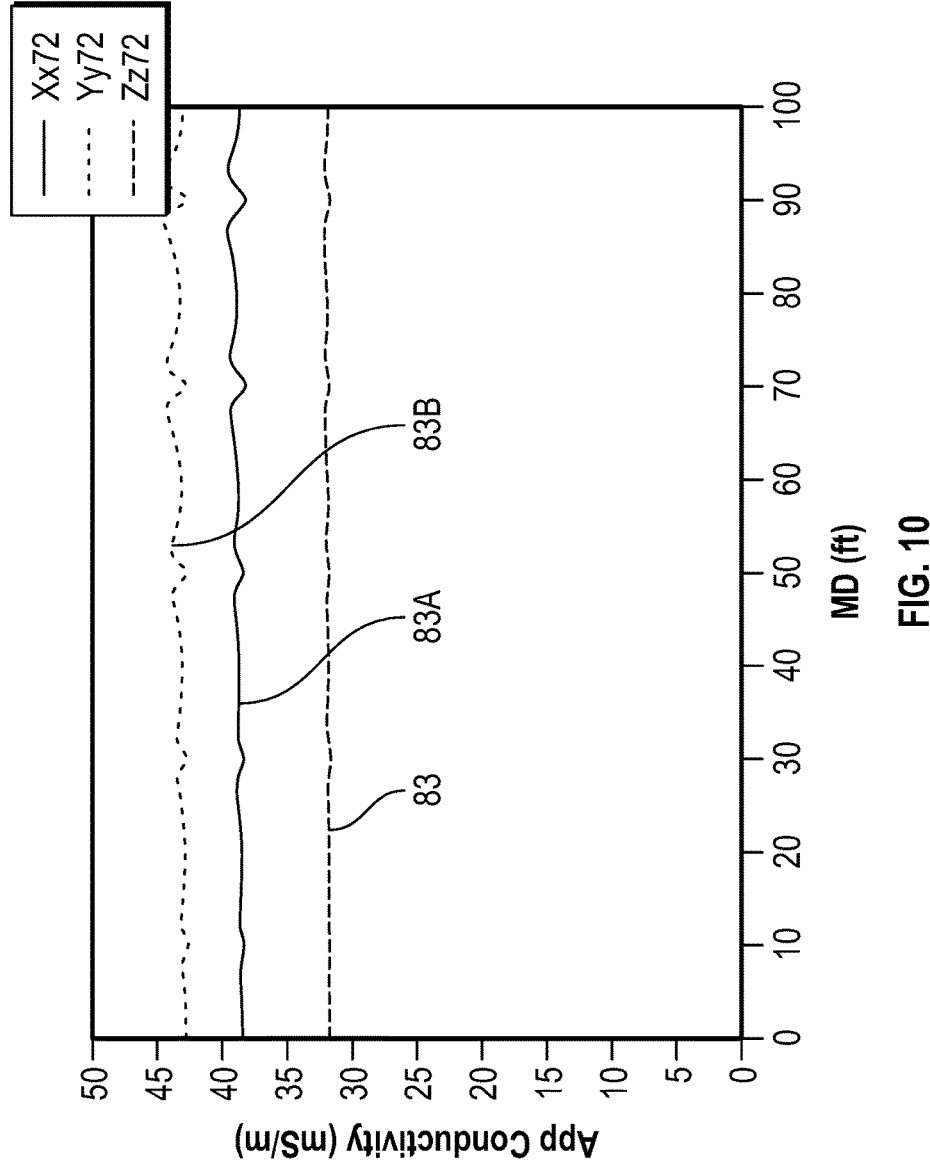

FIG. 10 shows the XX response (curve 83B), YY response (curve 83A), and ZZ response (curve 83) responses through the fractures modeled in FIG. 6 at an angle of θ=0°, that is, the fractures are parallel to the wellbore trajectory. In this example, one does not observe any sharp movement of the XX and YY responses. These types of fractures that are parallell to the wellbore may be detected by a method such as one described in the Wu et al. publication cited hereinabove.

Based on modeling results, the following example method may be used to detect vertical fractures in horizontal well using multiaxial induction measurements. The present example method is fast (less computational burden) and may provide a quantitative description of the fracture location and a qualitative indication of the fracture aperture. The present example method may be suitable for real-time application, that is, presenting results while the well logging instrument is moved along the wellbore.

Fracture Detection Algorithm

Figure 11:
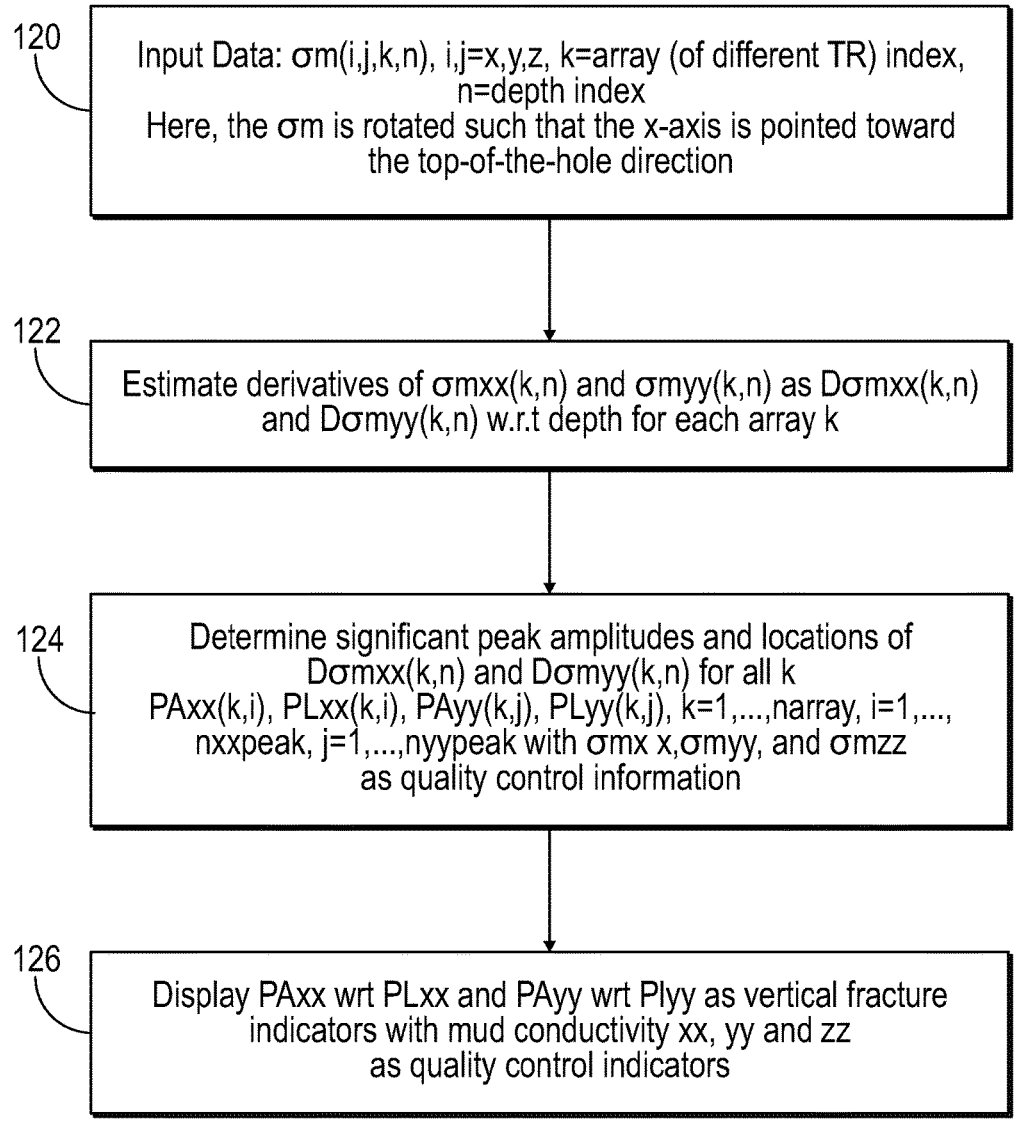
FIG. 11 shows a flow chart of an example implementation of a method according to the present disclosure.

A flow chart of an example algorithm for fracture detection according to the present disclosure is shown in FIG. 11. The input signals are shown at 120. The symbol $\sigma m(i,j,k,n)$, $i,j=x,y,z$, k=array (of different transmitter to receiver array [TR] spacing) index, n=depth index, represents the measured apparent conductivity tensor from the $k^{th}$ TR spacing array measured at $n^{th}$ depth (axial position) index location along the wellbore trajectory. The i and j index with values from 1 to 3 represent the transmitter and receiver triaxial coil magnetic moment direction x, y, z, respectively. The MD(n) is the measured depth of the instrument on the well path at the $n^{th}$ sample index, n=1, . . . , ndepth. The $\sigma m(i,j,k,n)$ in the present example is the rotated apparent conductivity tensor such that the magnetic moment of the x-axis direction magnetic dipole moment is pointing vertically upward or to the direction of the gravitational top of the wellbore.

At 122, first derivatives of the XX and YY components of $\sigma m(i,j,k,n)$ are estimated with respect to the depth index.

$$\sigma mxx(k,n)=\sigma m(1,1,k,n)$$

$$\sigma myy(k,n)=\sigma m(2,2,k,n)$$

Let $d\sigma mxx(k,n)/dMD$ and $d\sigma myy(k,n)/dMD$ be the first derivative of $\sigma mxx(k,n)$ and $\sigma myy(k,n)$ with respect to depth, MD, for each receiver array k, respectively. There are many methods to compute the derivative of a function with respect to selected variables. The exact detail of the method is not essential. The point is to identify the MD position of the drop in the value of $\sigma mxx(k,n)$ and $\sigma myy(k,n)$ as illustrated by the model data described above with respect to FIGS. 7 through 10. For example, one may use a single sided forward difference with a 3-sample shift. Other variations of the method may work as well. The foregoing presumes that the measurements are recorded or obtained as discrete samples at points along the well trajectory each assigned a value of MD, as explained above.

At 124 significant peaks in $d\sigma mxx(k,n)/dMD$ and $d\sigma myy(k,n)/dMD$ are identified and the peak signal amplitudes and axial positions thereof are determined.

Let PAxx(k,i), PLxx(k,i) k=1, . . . , narray, i=1, . . . , nxxpeak be the peak amplitude and peak amplitude axial location of $d\sigma mxx(k,n)/dMD$.

$$PAxx(k,i)=d\sigma mxx(k,ixxpk)/dMD$$

$$PLxx(k,i)=MD(ixxpk)$$

where ixxpk is the i-th depth index such that $d\sigma mxx(k,ixxpk-1) < d\sigma mxx(k,ixxpk) > d\sigma mxx(k,ixxpk+1)$ and PAxx(k,i)>PAcut.

Let PAyy(k,j), PLyy(k,j), k=1, . . . , narray, j=1, . . . , nyypeak be the peak amplitude and peak location of $d\sigma myy(k,n)/dMD$ $$PAyy(k,j)=d\sigma mxx(k,jyypk)/dMD$$

$$PLyy(k,j)=MD(jyypk)$$

where jyypk is the j-th depth index such that dσmxx(k, jyypk−1)<dσmxx(k,jyypk)>dσmxx(k,jyypk+1) and PAyy(k,j)>PAcut.

The PAcut in the above expressions is a threshold value above which the peaks in dσmxx(k,n) and dσmyy(k,n) are considered indicative of a fracture. The value of PAcut may be empirically determined or may be determined from modeling results such as described above with reference to FIGS. 7 through 10.

There are many known algorithms for determining peaks of a given functions. Again, the exact details of the peak finding algorithm is not to be construed as a limitation on the scope of the present disclosure. Many different versions would work as well. The threshold value PAcut is designed to exclude certain noise peaks that may occur in actual wellbore measurement data so that the calculated results will appear less cluttered. Determining and applying PAcut to the calculations of the signal amplitudes is not essential because the peak value for large fractures will usually be observable and thus determinable above the noise if all the signal amplitude peaks are evaluated. Without the PAcut filtering, there is substantially no risk of failure to detect large fractures.

At 126 results are displayed such that the fracture locations and the associated fracture aperture indications may be identified together with the input measurements σmxx, σmyy, and σmzz as quality control information. Here σmzz=σm(3,3,k,n).

The values of PAxx(k,PLxx(k,i)) and PA (k,PLyy(k,j)) may be plotted out as logs (curves with respect to measured depth MD) for a given receiver array k. Define the following names, HWVFIXX(k) and HWVFIYY(k), for the foregoing two log curves.

First, initialize the foregoing two log curves with zeros at every depth sample:

$$HWVFIXX(k,n)=0, n=1,\ldots,ndepth$$

$$HWVFIYY(k,n)=0, n=1,\ldots,ndepth$$

Then, reassign their values at the depth PLxx(k,i) and PLxx(k,i)

$$HWVFIXX(k,ixxpk)=PAxx(k,PLxx(k,i))$$

$$HWVFIYY(k,iyypk)=PA(k,PLyy(k,j))$$

The parameter HWVFIXX is defined as a Horizontal Well Vertical Fracture Indicator from the XX signal component. The HWVFIYY is defined as a Horizontal Well Vertical Fracture Indicator from the YY signal component.

The foregoing two components of a fracture indicator will have zero values everywhere except at depths where the dσmxx(k,n)/dMD and dσmyy(k,n)/dMD have a significant non-zero peak. The amplitude of the non-zero values are the peak values of the derivative dσmxx(k,n) and dσmyy(k,n). The peak values of the derivatives are proportional to the sharp drop distance traversed by the XX and YY components which in term are proportional to the fracture aperture as was determined from the modeling response explained with reference to FIGS. 6 through 8. The values of the HWVFIXX and HWVFIYY indicators thus obtained are quantitative indications of the fracture locations and qualitative indications of the fracture apertures. In a constant background resistivity formation, which frequently is the case for a wellbore drilled along the bedding plane of a fractured shale formation, the amplitude of HWVFIXX and HWVFIYY at various fracture locations accurately reflects the relative fracture aperture. The fracture locations indicated by HWVFIXX and HWVFIYY are the main receiver R locations of the k-th receiver array associated with the measurement depth of the σm(i,j,k,n) signals. If the measurement depth of the m(i,j,k,n) signals is defined as the measurement depth of the transmitter, then the true measured depth of the fracture should be deeper than HWVFIXX and HWVFIYY by the transmitter to main receiver R axial distance. The true measured depth of the fractures will be indicated by:

$$HWVFIXXT=HWVFIXX(k,ixxpk+D2(k)/dsi)$$

$$HWVFIYYT=HWVFIYY(k,iyypk+D2(k)/dsi)$$

Where D2(k) is the distance between the transmitter and the main receiver R for the k-th receiver array and dsi is the depth sampling interval. The depth shifted HWVFIXXT and HWVFIYYT channels stand for Horizontal Well Vertical Fracture Indicator from XX and YY components with True depth, respectively.

As quality control measures, fracture indicator values HWVFIXX and HWVFIYY may be plotted together with the σmxx, σmxx, and σmzz on the sample data plot. It may be advantageous to plot HWVFIXX and HWVFIYY instead of the true depth indicators HWVFIXXT and HWVFIYYT because it is easier to observe the correlation between the characteristic response of the measurements σmxx, σmxx, and σmzz to fractures with the depth of the main receiver R position. A fracture indication on HWVFIXX and HWVFIYY should match the characteristic pattern described above with σmxx, σmxx, and σmzz as each main receiver R traverses the fracture. If several receiver arrays of different transmitter-to-receiver (TR) spacing (k-index) of the multiaxial induction logging instrument exhibit the same characteristic response, the confidence level of the indication as being an actual fracture will be high. Conversely, if at the fracture indicator location there is no characteristic pattern exhibited in σmxx, σmxx, and σmzz from any of the receiver arrays, the indication may represent a feature other than a fracture.

Figure 12:
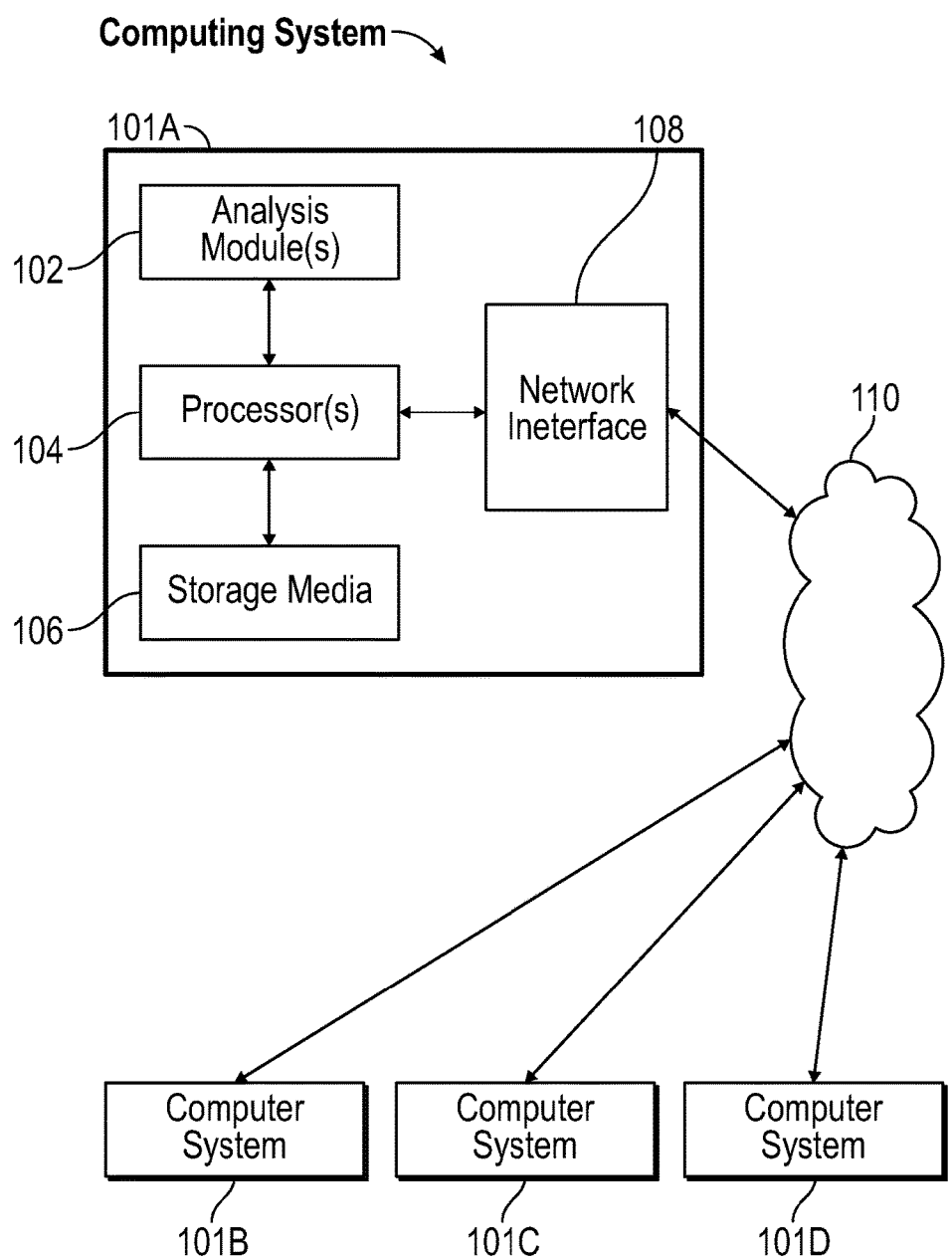
FIG. 12 shows an example computer system that may be used to implement a method according to the present disclosure.

FIG. 12 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks shown in FIG. 11. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, at a well location (such as in a well logging unit), and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 12 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium or may be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 12, and/or computing system 100 may have a different configuration or arrangement of the components depicted in FIG. 12. The various components shown in FIG. 12 may be implemented in hardware, software, or a combination of both hardware and software, including one or more signal processing and/or application specific integrated circuits.

Further, the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for characterizing fractures traversing a wellbore, comprising:
   (a) accepting as input to a computer multiaxial electromagnetic induction measurements corresponding to measurements made along at least one of two mutually orthogonal magnetic dipole axes perpendicular to an axis of the wellbore, the measurements corresponding to at least one receiver spacing from a transmitter, the measurements representing induced voltage in a receiver having a same dipole moment direction as a dipole moment direction of a transmitter;
   (b) in the computer, calculating a first derivative with respect to wellbore depth of the multiaxial electromagnetic induction measurements;
   (c) in the computer determining at least one peak and an amplitude thereof of the first derivative; and
   (d) in the computer using the peak and the amplitude to determine a location and an aperture of at least one fracture traversing the wellbore by displaying the first derivative with respect to wellbore depth in the computer.

2. The method of claim 1 wherein two mutually orthogonal axes are rotated such that one thereof is in a vertical direction.

3. The method of claim 1 further comprising selecting a threshold value for amplitude and in the computer excluding from evaluation any peak in the first derivatives with respect to wellbore depth below the selected threshold value.

4. The method of claim 1 further comprising accepting as input to the computer multiaxial electromagnetic induction measurements at at least one additional receiver spacing from the transmitter and repeating (b), (c) and (d) for the at least one additional receiver spacing.

5. The method of claim 4 further comprising using (d) for at least one receiver spacing and (d) for at least one additional receiver spacing to determine a likelihood that the peak represents a true fracture.

6. The method of claim 1 further comprising in the computer displaying the input electromagnetic induction measurements in depth correspondence with the first derivatives thereof as a quality control indication.

7. A system for fracture characterization, comprising:
   a processor and a display, the processor programmed to perform actions comprising;
      (a) accept as input to a computer multiaxial electromagnetic induction measurements corresponding to measurements made along two mutually orthogonal magnetic dipole axes perpendicular to an axis of the wellbore, the measurements corresponding to at least one receiver spacing from a transmitter, the measurements representing induced voltage in a receiver having a same dipole moment direction as a dipole moment direction of a transmitter,
      (b) calculating a first derivative with respect to wellbore depth of the multiaxial electromagnetic induction measurements,
      (c) determining at least one peak and an amplitude thereof of the first derivative,
      (d) using the peak and the amplitude to determine a location and an aperture of at least one fracture traversing the wellbore and;
   displaying the determined first derivatives with respect to wellbore depth on the display.

8. The system of claim 7 wherein two mutually orthogonal axes are rotated such that one thereof is in a vertical direction.

9. The system of claim 7 wherein the processor is further programmed to accept a selected threshold value for amplitude and to exclude from evaluation any peak in the first derivatives with respect to wellbore depth less than the selected threshold value.

10. The system of claim 7 wherein the processor is programmed accept as input multiaxial electromagnetic induction measurements at at least one additional receiver spacing from the transmitter and to repeat (b), (c) and (d) for at least one additional receiver spacing.

11. The system of claim 10 wherein the processor is further programmed to use (d) for at least one receiver spacing and to use (d) for at least one additional receiver spacing to determine a likelihood that the peak represents a true fracture.

12. The system of claim 7 wherein the processor is further programmed to display the input electromagnetic induction measurements in depth correspondence with the first derivatives thereof as a quality control indication.

13. A method for well logging, comprising:
(a) moving a multiaxial electromagnetic induction instrument along a wellbore drilled through subsurface formations;
(b) energizing at least one multiaxial electromagnetic transmitter to impart an electromagnetic field in the subsurface formations along a plurality of magnetic dipole direction;
(c) measuring induced voltage at at least one spaced apart position from the at least one multiaxial transmitter, the measuring resulting in signals corresponding to induced voltage along two mutually orthogonal magnetic dipole moment axes each perpendicular to a longitudinal axis of the wellbore;
(d) calculating a first derivative with respect to wellbore depth of the induced voltages;
(e) determining at least one peak and an amplitude thereof of the first derivatives; and
(f) using the peak and the amplitude to determine a location and an aperture of at least one fracture traversing the wellbore by displaying the first derivative with respect to wellbore depth.

14. The method of claim 13 wherein two mutually orthogonal axes are rotated such that one thereof is in a vertical direction.

15. The method of claim 13 further comprising selecting a threshold value for amplitude and excluding from evaluation any peak in the first derivatives with respect to wellbore depth.

16. The method of claim 13 further comprising measuring induced voltages at at least one additional spaced apart position from the transmitter and repeating (c), (d), (e) and (f) for the at least one additional spaced apart position from the at least one multiaxial electromagnetic transmitter.

17. The method of claim 16 further comprising using (f) for at least one spaced apart position and (f) for the at least one additional spaced apart position to determine a likelihood that the peak represents a true fracture.

18. The method of claim 13 further comprising displaying the induced voltage measurements in depth correspondence with the first derivatives thereof as a quality control indication.

19. The method of claim 13 wherein the moving the well logging instrument comprises moving an electrical cable along the wellbore.

20. The method of claim 13 wherein the moving the well logging instrument comprises moving a drill string along the wellbore.

* * * * *